(12) United States Patent
Kodama et al.

(10) Patent No.: US 10,583,700 B2
(45) Date of Patent: Mar. 10, 2020

(54) TIRE STATE MONITORING SYSTEM

(71) Applicant: The Yokohama Rubber Co., LTD., Minato-ku, Tokyo (JP)

(72) Inventors: Yuji Kodama, Hiratsuka (JP); Koji Nakatani, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 310 days.

(21) Appl. No.: 15/539,123

(22) PCT Filed: Dec. 26, 2014

(86) PCT No.: PCT/JP2014/084534
§ 371 (c)(1),
(2) Date: Jun. 22, 2017

(87) PCT Pub. No.: WO2016/103453
PCT Pub. Date: Jun. 30, 2016

(65) Prior Publication Data
US 2017/0368893 A1    Dec. 28, 2017

(51) Int. Cl.
*B60C 23/04* (2006.01)
*B60W 30/14* (2006.01)
(Continued)

(52) U.S. Cl.
CPC .......... *B60C 23/0466* (2013.01); *B60C 23/04* (2013.01); *B60C 23/0452* (2013.01); *B60C 23/0462* (2013.01); *B60C 23/0479* (2013.01); *B60C 23/0444* (2013.01); *B60C 23/061* (2013.01); *B60T 8/1725* (2013.01);
(Continued)

(58) Field of Classification Search
None
See application file for complete search history.

(56) References Cited

U.S. PATENT DOCUMENTS 5,442,553 A * 8/1995 Parrillo ............ G06F 8/65
    455/420
6,405,132 B1 * 6/2002 Breed ............ B60N 2/002
    701/301
(Continued)

FOREIGN PATENT DOCUMENTS

JP   S60-024479   2/1985
JP   S64-041405   2/1989
(Continued)

OTHER PUBLICATIONS

International Search Report for International Application No. PCT/JP2014/084534 dated Mar. 24, 2015, 4 pages, Japan.

*Primary Examiner* — Jill E Culler
(74) *Attorney, Agent, or Firm* — Thorpe North & Western

(57) ABSTRACT

A tire state monitoring system includes: tire state acquisition devices installed on tires of a host vehicle, each of the tire state acquisition devices being configured to acquire a tire state quantity; a monitoring device configured to receive an output signal from each of the tire state acquisition devices and perform predetermined processing; and an alerting device configured to issue an alert to a following vehicle. In addition, the monitoring device causes the alerting device to operate when a predetermined abnormality has arisen in the tire state quantity.

1 Claim, 14 Drawing Sheets

(51) Int. Cl.
*B60W 30/165* (2020.01)
*B60W 30/16* (2020.01)
*B60W 30/17* (2020.01)
*B60C 23/06* (2006.01)
*B60T 8/172* (2006.01)

(52) U.S. Cl.
CPC ............ *B60W 30/14* (2013.01); *B60W 30/16* (2013.01); *B60W 30/165* (2013.01); *B60W 30/17* (2013.01)

(56) References Cited

U.S. PATENT DOCUMENTS

| | | | |
|---|---|---|---|
| 8,483,903 B2* | 7/2013 | Tengler | B60R 16/00 340/435 |
| 2003/0156021 A1 | 8/2003 | Tabata et al. | |
| 2004/0078133 A1* | 4/2004 | Miller | B60K 31/0008 701/96 |
| 2006/0001532 A1 | 1/2006 | Nagata | |
| 2007/0159314 A1 | 7/2007 | Zhu | |
| 2009/0192666 A1* | 7/2009 | Trippler | G08G 1/163 701/31.4 |
| 2016/0054735 A1* | 2/2016 | Switkes | G08G 1/22 701/23 |

FOREIGN PATENT DOCUMENTS

| | | |
|---|---|---|
| JP | H01-321600 | 12/1989 |
| JP | H08-193831 | 7/1996 |
| JP | 2005-145385 | 6/2005 |
| JP | 2005-212791 | 8/2005 |
| JP | 2006-019908 | 1/2006 |
| JP | 2006-519722 | 8/2006 |
| JP | 2007-121274 | 5/2007 |
| JP | 2008-112372 | 5/2008 |
| JP | 2008-155795 | 7/2008 |
| JP | 2009-280081 | 12/2009 |
| JP | 2010-188768 | 9/2010 |
| JP | 2014-223863 | 12/2014 |
| WO | WO 2004/103739 | 12/2004 |

* cited by examiner

|  |  | PROXIMITY P | |
|---|---|---|---|
|  |  | P< k1 | k1≥ P |
| ABNORMALITY IN TIRE STATE QUANTITY | NO | -<br>(NO ALERT) | -<br>(NO ALERT) |
|  | YES | -<br>(NO ALERT) | ALERT FOLLOWING VEHICLE |

FIG. 6

P< k1 OR NO ABNORMALITY IN TIRE STATE QUANTITY
(NO ALERT)

k2≤ P AND ABNORMALITY IN TIRE STATE QUANTITY
(ALERT ISSUED)

|  |  | MOUNTING POSITION OF ABNORMAL TIRE ||
|  |  | NOT STEERED WHEEL | STEERED WHEEL |
| --- | --- | --- | --- |
| ABNORMALITY IN TIRE STATE QUANTITY | NO | -<br>(NO ALERT) | -<br>(NO ALERT) |
|  | YES | LOW-LEVEL ALERT | HIGH-LEVEL ALERT |

FIG. 9

ABNORMALITY IN TIRE STATE QUANTITY
FOR WHEEL ASIDE FROM STEERED WHEEL
(LOW-LEVEL ALERT)

ABNORMALITY IN TIRE STATE QUANTITY
FOR STEERED WHEEL
(HIGH-LEVEL ALERT)

|  |  | MOUNTING POSITION OF ABNORMAL TIRE ||
|  |  | NOT STEERED WHEEL | STEERED WHEEL |
|---|---|---|---|
| ABNORMALITY IN TIRE STATE QUANTITY | NO | -<br>(NO ALERT) | -<br>(NO ALERT) |
|  | YES | LOW-LEVEL ALERT | MID-LEVEL ALERT |

P< k1
(NO ALERT LEVEL UP)

FIG. 12A

|  |  | MOUNTING POSITION OF ABNORMAL TIRE ||
|  |  | NOT STEERED WHEEL | STEERED WHEEL |
|---|---|---|---|
| ABNORMALITY IN TIRE STATE QUANTITY | NO | LOW-LEVEL ALERT | LOW-LEVEL ALERT |
|  | YES | MID-LEVEL ALERT | HIGH-LEVEL ALERT | k1≥ P
(ALERT LEVEL UP)

FIG. 12B

|  |  | NUMBER N OF ABNORMAL TIRES | |
|---|---|---|---|
|  |  | N < k2 | k2 ≥ N |
| ABNORMALITY IN TIRE STATE QUANTITY | NO | -<br>(NO ALERT) | -<br>(NO ALERT) |
|  | YES | LOW-LEVEL ALERT | MID-LEVEL ALERT |

P < k1
(NO ALERT LEVEL UP)

FIG. 14A

|  |  | NUMBER N OF ABNORMAL TIRES | |
|---|---|---|---|
|  |  | N < k2 | k2 ≥ N |
| ABNORMALITY IN TIRE STATE QUANTITY | NO | LOW-LEVEL ALERT | LOW-LEVEL ALERT |
|  | YES | MID-LEVEL ALERT | HIGH-LEVEL ALERT | k1 ≥ P
(ALERT LEVEL UP)

FIG. 14B

TIRE STATE MONITORING SYSTEM

TECHNICAL FIELD

This technology relates to a tire state monitoring system, and particularly relates to a tire state monitoring system capable of preventing a following vehicle from colliding with a host vehicle.

BACKGROUND ART

Tire state monitoring systems have conventionally been known which monitor a tire state quantity (e.g., air pressure, temperature, or the like) of pneumatic tires. Such a tire state monitoring system is provided with a tire state acquisition device which is disposed in a cavity portion of a pneumatic tire and acquires a tire state quantity (e.g., air pressure or temperature) and a monitoring device which receives radio waves from the tire state acquisition device to monitor the tire state quantity.

Additionally, collision prevention systems have conventionally been known which prevent a following vehicle from colliding with a host vehicle. Such a conventional collision prevention system issues an alert from the host vehicle to the following vehicle when a distance between the host vehicle and the following vehicle is small, the following vehicle is rapidly approaching the host vehicle, or the like, in order to catch the attention of the driver of the following vehicle. This configuration prompts the following vehicle to take appropriate measures such as ensuring a sufficient distance with respect to the host vehicle, which can prevent the following vehicle from colliding with the host vehicle. The techniques disclosed in Japanese Unexamined Patent Application Publication Nos. S60-024479A, H01-321600A and H08-193831A are known, conventional collision prevention systems.

SUMMARY

This technology provides a tire state monitoring system capable of preventing a following vehicle from colliding with a host vehicle.

A tire state monitoring system according to this technology includes: a plurality of tire state acquisition devices installed on a plurality of tires of a host vehicle, each of the tire state acquisition devices being configured to acquire a tire state quantity; a monitoring device configured to receive an output signal from each of the plurality of tire state acquisition devices and perform predetermined processing; and an alerting device configured to issue an alert to a following vehicle. The monitoring device is configured to cause the alerting device to operate when a predetermined abnormality has arisen in the tire state quantity.

In the tire state monitoring system according to this technology, the monitoring device causes the alerting device to issue an alert to the following vehicle when any abnormality arises in the tire state quantities. This configuration provides an advantage in that in a situation where the traveling state of the host vehicle may become unstable, an alert is issued as appropriate to the following vehicle so as to prevent the following vehicle from colliding with the host vehicle.

BRIEF DESCRIPTION OF DRAWINGS

FIG. 6 is an explanatory diagram illustrating operations of the tire state monitoring system illustrated in FIG. 1.

FIG. 9 is an explanatory diagram illustrating operations of the first modified example of the tire state monitoring system illustrated in FIG. 1.

FIGS. 12A and 12B are explanatory diagrams illustrating operations of the second modified example of the tire state monitoring system illustrated in FIG. 1.

FIGS. 14A and 14B are explanatory diagrams illustrating operations of the third modified example of the tire state monitoring system illustrated in FIG. 1.

DETAILED DESCRIPTION

Embodiments of the present technology are described in detail below with reference to the drawings. However, the present technology is not limited to these embodiments. Moreover, constituents of the embodiments include elements that are replaceable while maintaining consistency with the technology, and obviously replaceable elements. Furthermore, the modified examples described in the embodiments can be combined as desired within the scope apparent to those skilled in the art.

Tire State Monitoring System

Figure 1:
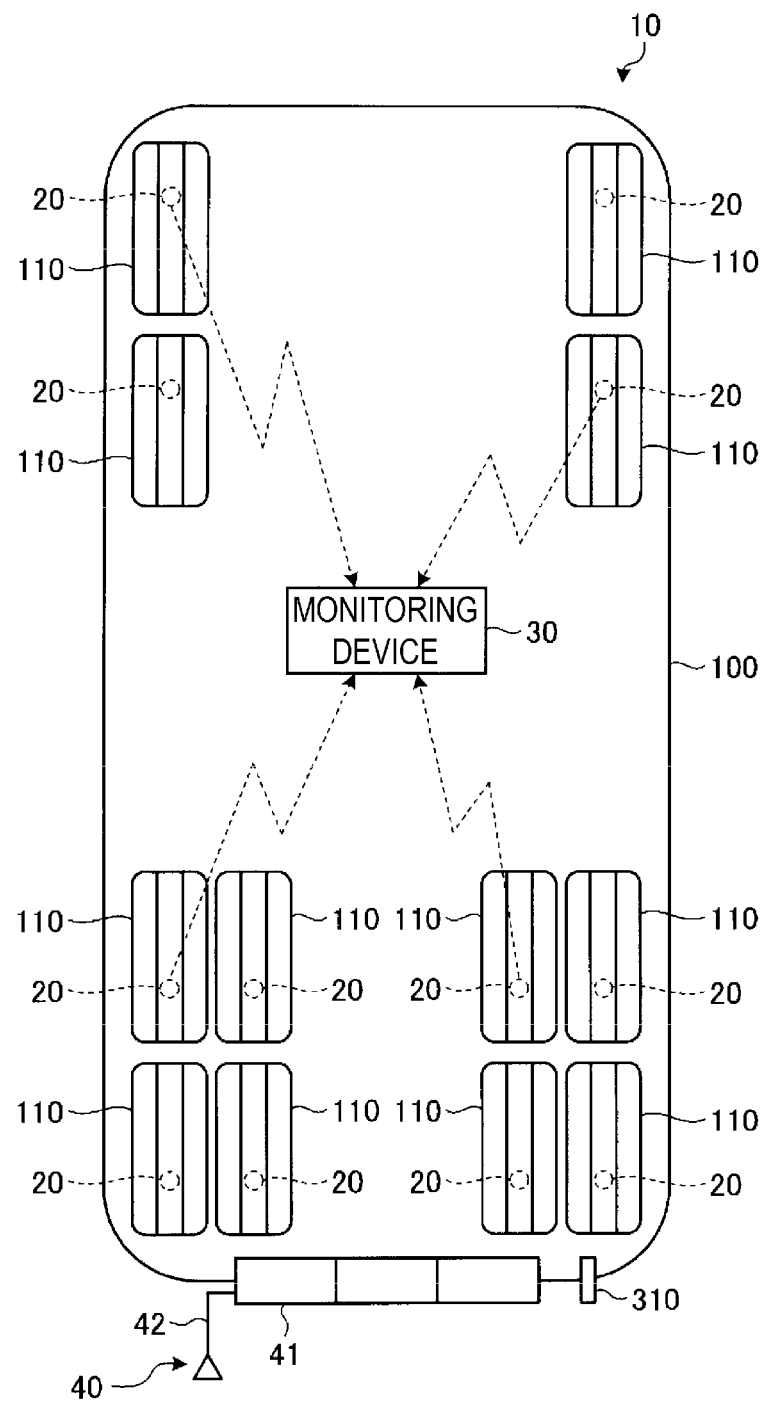
FIG. 1 is a configuration diagram illustrating a tire state monitoring system according to an embodiment of the present technology.
Figure 2:
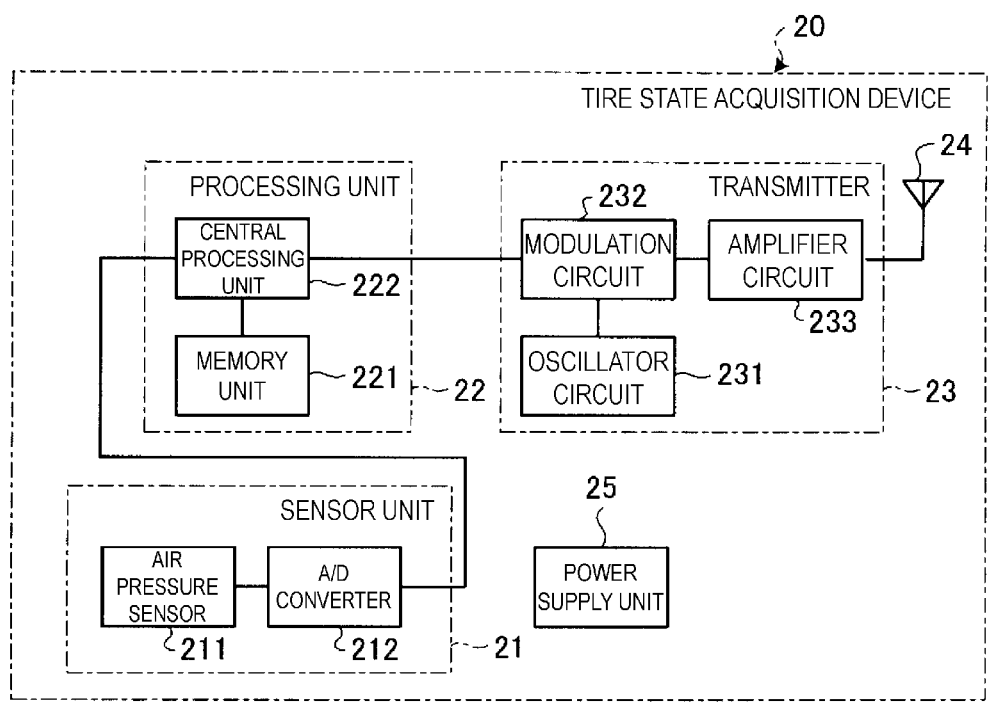
FIG. 2 is a block diagram illustrating a tire state acquisition device in the tire state monitoring system illustrated in FIG. 1.
Figure 3:
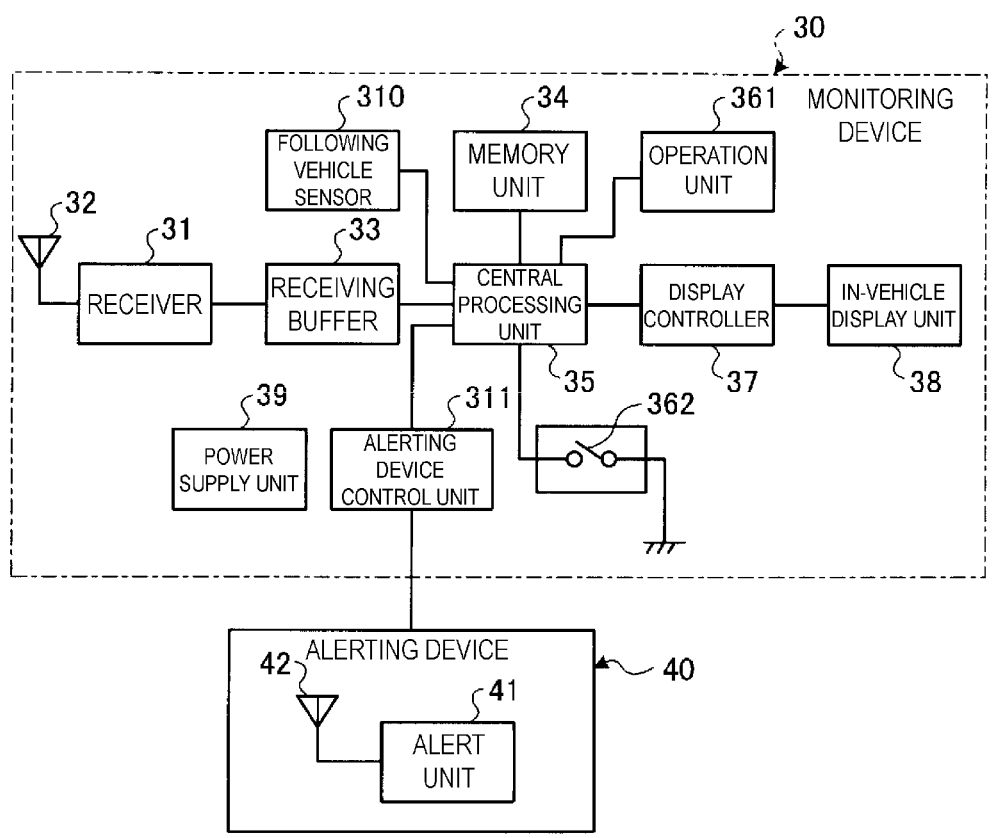
FIG. 3 is a block diagram illustrating a monitoring device and an alerting device in the tire state monitoring system illustrated in FIG. 1.
Figure 4:
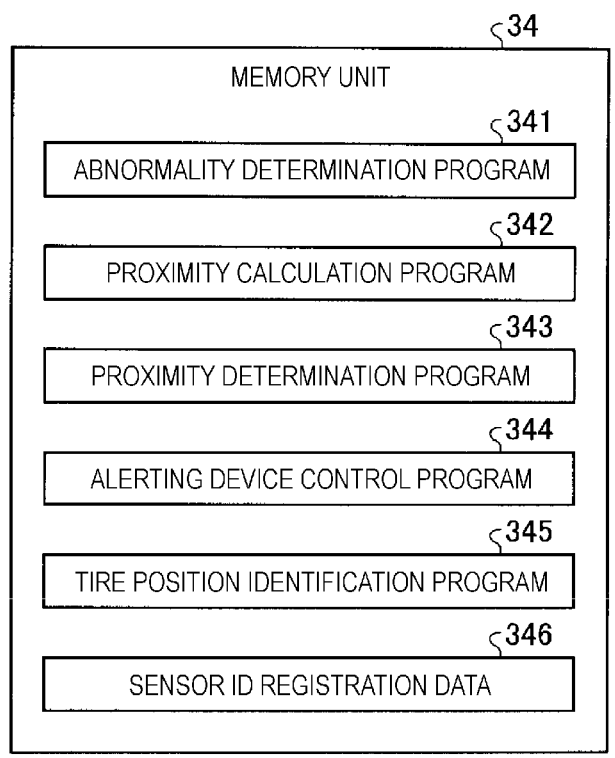
FIG. 4 is a block diagram illustrating a memory unit of the monitoring device illustrated in FIG. 3.

FIG. 1 is a configuration diagram illustrating a tire state monitoring system according to an embodiment of the present technology. FIG. 1 schematically illustrates a host vehicle 100 in which a tire state monitoring system 10 is installed. FIG. 2 is a block diagram illustrating a tire state acquisition device in the tire state monitoring system illustrated in FIG. 1. FIG. 3 is a block diagram illustrating a monitoring device and an alerting device in the tire state monitoring system illustrated in FIG. 1. FIG. 4 is a block diagram illustrating a memory unit of the monitoring device illustrated in FIG. 3. FIG. 4 illustrates various programs and data stored in a memory unit 34.

The tire state monitoring system 10 is a system that monitors tire state quantity of a pneumatic tire 110. Examples of the tire state quantity include air pressure and temperature within a tire cavity, acceleration acting on the tire, and the like. A tire pressure monitoring system (TPMS) that monitors the air pressure in the pneumatic tires 110 mounted on a vehicle will be described herein as one example of the tire state monitoring system 10. It is preferable that the tire state monitoring system 10 be mounted particularly in a vehicle having six or more wheels, such as a truck, a bus, or a trailer. For this embodiment, a configuration will be described where the host vehicle 100 is a truck in a 2/2-4D/4D configuration (i.e., a tandem single tire steering axle with a tandem dual tire drive axle), and the pneumatic tires 110 are mounted on the respective wheels.

The tire state monitoring system 10 includes a tire state acquisition device 20, a monitoring device 30, and an alerting device 40 (see FIGS. 1 to 3).

The tire state acquisition device 20 is a device that acquires or detects the tire state quantity of the corresponding pneumatic tire 110. The tire state acquisition device 20 is installed for each of the pneumatic tires 110 of the host vehicle 100 (see FIG. 1). The tire state acquisition device 20 includes a sensor unit 21, a processing unit 22, a transmitter 23, an antenna 24, and a power supply unit 25 (see FIG. 2). The sensor unit 21 includes an air pressure sensor 211 which detects and outputs the air pressure of a tire, and an A/D converter 212 which A/D-converts an output signal from the air pressure sensor 211 and outputs the converted signal.

The processing unit 22 includes, for example, a memory unit 221 which stores a predetermined program, and a central processing unit 222 which loads the predetermined program from the memory unit 221 and execute the program to generate and output predetermined air pressure data on the basis of on the output signal from the air pressure sensor 211. The transmitter 23 includes an oscillator circuit 231 which generates a carrier wave signal, a modulation circuit 232 which modulates the carrier wave signal output from the oscillator circuit 231 on the basis of an output signal from the central processing unit 222 and outputs the modulated signal, and an amplifier circuit 233 which amplifies the output signal from the modulation circuit 232 and outputs the amplified signal. The antenna 24 is connected to the amplifier circuit 233 of the transmitter 23. The power supply unit 25 is a secondary cell, for example, and supplies power to the tire state acquisition device 20.

The monitoring device 30 is a device that monitors the tire state quantity acquired by the tire state acquisition device 20 and performs predetermined processing. The monitoring device 30 includes a receiver 31, an antenna 32, a receiving buffer 33, the memory unit 34, a central processing unit 35, an operating unit 361, a switch 362, a display controller 37, an in-vehicle display unit 38, a power supply unit 39, a following vehicle sensor 310, and an alerting device control unit 311 (see FIG. 3).

The receiver 31 receives a radio signal related to air pressure data (i.e., a tire state quantity) from the tire state acquisition device 20 via the antenna 32, extracts the air pressure data and identification information data from the signal, and outputs the air pressure data and the identification information data. The antenna 32 is connected to the receiver 31. The receiving buffer 33 temporarily stores the air pressure data and the identification information data received from the receiver 31. The memory unit 34 stores a predetermined program, a table containing communication protocols used for the tire state acquisition device 20, and the like. The central processing unit 35 loads the predetermined program from the memory unit 34 and executes the program to perform predetermined processing on the basis of the air pressure data and the identification information data in the receiving buffer 33. This processing includes, for example, a process that determines an abnormality in tire air pressure, a process that generates a determination result, a process that causes the in-vehicle display unit 38 to display the determination result, and the like. The operating unit 361 is an input unit for inputting various pieces of information into the monitoring device 30. The switch 362 is an on/off switch for turning the monitoring device 30 on. The display controller 37 controls the display content on the in-vehicle display unit 38 on the basis of signals output from the central processing unit 35. The in-vehicle display unit 38 is disposed at the driver's seat of the host vehicle 100, for example, and displays predetermined display content. The power supply unit 39 is the battery of the host vehicle 100, for example, and supplies power to the monitoring device 30.

The following vehicle sensor 310 acquires information necessary for calculating a proximity P of a following vehicle 200, which will be described below. A vehicle-to-vehicle distance sensor or a relative velocity sensor that measures a distance or a relative velocity between the host vehicle 100 and the following vehicle 200 can be employed as the following vehicle sensor 310. Examples of such a sensor include a millimeter wave radar, an infrared radar, a Doppler radar, and the like. The sensor emits a sensor signal to the rearward of the host vehicle 100, receives a reflection wave from the following vehicle 200, and outputs a signal corresponding to the distance or relative velocity between the host vehicle 100 and the following vehicle 200. Alternatively, an image sensor can be employed as the following vehicle sensor 310. The image sensor captures an image of the rearward view of the host vehicle 100 and outputs resulting image information on the following vehicle 200. The proximity P of the following vehicle 200, which will be described below, can be calculated on the basis of these output signals.

The alerting device control unit 311 controls the driving of the alerting device 40, which will be described below.

Additionally, the memory unit 34 of the monitoring device 30 stores various programs 341 to 345 and data 346 (see FIG. 4). The various programs 341 to 345 include the following: an abnormality determination program 341 that determines whether or not an abnormality has arisen in a tire state quantity; a proximity calculation program 342 that calculates the proximity P of the following vehicle 200; a proximity determination program 343 that determines the proximity P of the following vehicle 200; an alerting device control program 344 that controls the driving of the alerting device 40, which will be described below; and a tire position identification program 345 that identifies mounting positions of the tires from sensor IDs uniquely assigned to the tire state acquisition devices 20. The data 346 includes sensor ID registration data 346 in which the sensor IDs of the tire state acquisition devices 20 are associated with the tire mounting positions. The programs 341 to 345 and the data 346 will be described below.

The alerting device 40 is a device that issues an alert from the host vehicle 100 to the following vehicle 200. For example, a lamp unit 41 (see FIG. 1) installed in a position visible from the following vehicle 200 (a rear part of the host vehicle 100, for example), a speaker unit (not illustrated) that outputs audio to the rearward of the host vehicle 100, or a display unit (not illustrated), installed in a position visible from the following vehicle 200, that displays text, graphics, symbols, or the like, can be employed as the alerting device 40. With the lamp unit 41 or the speaker unit, an alert is issued from the host vehicle 100 to the following vehicle 200 through a lighting operation as an alert performed by the lamp unit 41 or audio as an alert output from the speaker unit. Alternatively, with the display unit, the alert is issued through a display of predetermined alert information.

A vehicle-to-vehicle communication unit that enables vehicle-to-vehicle communication between the host vehicle 100 and the following vehicle 200 can also be employed as the alerting device 40. The vehicle-to-vehicle communication unit is constituted of a communicator 42 installed in the host vehicle 100 (see FIG. 1) and a communicator 201 installed in the following vehicle 200 (see FIGS. 7A and 7B, which will be described below). In this tire state monitoring system 10, the communicator 42 of the host vehicle 100 functions primarily as a transmitter, whereas the communicator 201 of the following vehicle 200 functions primarily as a receiver. The communicator 42 of the host vehicle 100 transmits predetermined information regarding an alert to the communicator 201 of the following vehicle 200, so that an alert is issued from the host vehicle 100 to the following vehicle 200. Note that the communicator 201 of the following vehicle 200 may be a dedicated communicator to the vehicle-to-vehicle communication unit installed in the following vehicle 200, or may be, for example, a mobile information terminal (a smartphone or tablet in which a vehicle-to-vehicle communication application has been installed, for example) brought into the following vehicle 200.

The alerting device 40 may be an existing lamp unit installed in the host vehicle 100. For example, rear combination lamps provided on the left and right of the rear part of the host vehicle 100 can be employed as this lamp unit. The rear combination lamps each include a brake lamp, a tail lamp, a turn signal lamp, a back-up lamp, and the like. With the rear combination lamps, the host vehicle 100 issues an alert to the following vehicle 200 by simultaneously flashing the left and right turn signal lamps in the rear part of the host vehicle 100, for example.

Display of Tire Information to Host Vehicle

When the tire state monitoring system 10 is in operation, the tire state quantity of the tire 110 on each wheel is monitored, and a warning or an alert is issued to the driver of the host vehicle 100.

First, the tire state acquisition device 20 is installed for each of the tires 110 on the wheels of the host vehicle 100 (see FIG. 1), and detects the air pressure of a corresponding tire 110 as a tire state quantity. Specifically, in each tire state acquisition device 20, the sensor unit 21 (the air pressure sensor 211) detects the tire sate quantity of the tire 110 (the air pressure in the tire cavity), and the processing unit 22 then generates output data on the basis of an output signal from the sensor unit 21. The transmitter 23 then generates an output signal on the basis of the output data from the processing unit 22, and wirelessly transmits the output signal to the monitoring device 30 via the antenna 24. As a result, the output signals corresponding to the tire state quantities of tires 110 are transmitted from the tire state acquisition devices 20 to the monitoring device 30. Additionally, the sensor ID unique to the tire state acquisition device 20 is added to the corresponding output signal.

Next, the monitoring device 30 acquires the output signals from the tire state acquisition devices 20 via the antenna 32 of the receiver 31. Additionally, the central processing unit 35 generates predetermined display data regarding the tire state quantities of the tires 110 on the basis of the output signals, and the display controller 37 displays this display data on the in-vehicle display unit 38. As a result, predetermined information on the tire state quantities of the tires 110 is displayed on the in-vehicle display unit 38, which provides a warning to the driver of the host vehicle 100.

Specifically, the driver of the host vehicle 100 can confirm the tire state quantities of the tires 110 by operating the operating unit 361 of the monitoring device 30 so as to display desired tire information on the in-vehicle display unit 38.

The monitoring device 30 also monitors abnormalities in the tire state quantities of the tires 110 in real time. Specifically, the central processing unit 35 loads the abnormality determination program 341 from the memory unit 34 and executes the program so as to determine whether or not abnormalities have arisen in the tire state quantities of the tires 110. For example, when the air pressure in one of the tires 110 is less than or equal to a predetermined threshold value or has dropped suddenly in a short amount of time, the central processing unit 35 determines that an abnormality has arisen in that tire 110. The central processing unit 35 then displays, on the in-vehicle display unit 38, information regarding the tire state quantity of the tire 110 on the basis of the determination result. As this time, an alert indicating the abnormality, such as a drop in the air pressure in the tire 110 or a flat tire, is displayed along with information regarding the mounting position of that tire 110 (that is, an alert is displayed on the in-vehicle display unit 38). As a result, an alert indicating that an abnormality has arisen in the tire state quantity of each of the tires 110 is issued as appropriate to the driver of the host vehicle 100. Such an alert is issued through a flashing display of the tire information on the in-vehicle display unit 38, an alert sound, or the like, for example.

Note that in the above-described configuration, the tire state acquisition device 20 has the air pressure sensor 211 that measures the air pressure in the corresponding tire cavity (see FIG. 2), and the monitoring device 30 monitors the air pressure in the tire cavity as the tire state quantity and displays the predetermined tire information on the in-vehicle display unit 38. However, without being limited to such a configuration, the tire state quantities can be selected as appropriate within the scope of obviousness to those skilled in the art.

For example, the tire state acquisition device 20 may have a temperature sensor (not illustrated) that measures the temperature in the corresponding tire cavity, and the monitoring device 30 may monitor the temperature in the tire cavity as the tire state quantity and display the predetermined tire information on the in-vehicle display unit 38. For example, when the temperature in one of the tires 110 is greater than or equal to a predetermined threshold value or has risen suddenly in a short amount of time, the monitoring device 30 determines that an abnormality has arisen in that tire 110 and displays the predetermined information on the in-vehicle display unit 38.

Additionally, the tire state acquisition device 20 may have an acceleration sensor (not illustrated) that measures an acceleration acting on the corresponding tire, and the monitoring device 30 may monitor the acceleration acting on the tire as the tire state quantity and display the predetermined tire information on the in-vehicle display unit 38, for example. For example, when the acceleration acting in a tire axial direction measured by the acceleration sensor is greater than or equal to a predetermined threshold value, the monitoring device 30 assumes that the tire 110 is sliding laterally and thus determines that an abnormality has arisen in the tire 110. The technique disclosed in Japanese Unexamined Patent Application Publication No. 2007-121274 is known as a conventional example of this technique.

Preventing Following Vehicle from Colliding with Host Vehicle

As described above, when an abnormality has arisen in any of the tires 110 of the host vehicle 100, the traveling state may become unstable, leading to a drop in the travel speed or causing the vehicle to weave, for example. In such a case, it is preferable that an alert be issued to the following vehicle 200 from the host vehicle 100 in order to catch the attention of the driver of the following vehicle 200. This prompts the following vehicle 200 to take appropriate measures such as ensuring a sufficient distance with respect to the host vehicle 100, which can prevent the following vehicle 200 from colliding with the host vehicle 100. Such an alert is particularly useful when a distance between the host vehicle and the following vehicle is small or the following vehicle is rapidly approaching the host vehicle, for example.

Accordingly, for this tire state monitoring system 10, the following configuration is employed for preventing the following vehicle 200 from colliding with the host vehicle 100.

Note that the following vehicle is not limited to a passenger vehicle, a truck, a bus, or the like, and also includes a two-wheeled vehicle such as a motorcycle. Additionally, the following vehicle is not limited to a rearward vehicle traveling in the same lane as the host vehicle, and also includes a rearward vehicle traveling in a lane adjacent to the lane in which the host vehicle is traveling. For example, a collision between the host vehicle and a following vehicle that has changed lanes from the adjacent lane and is advancing into the travel path of the host vehicle may be prevented. Additionally, a collision between the host vehicle and a following vehicle traveling in a lane into which the host vehicle has entered may be prevented. Additionally, the following vehicle is not limited to a rearward vehicle traveling immediately behind the host vehicle, and also includes a vehicle traveling behind the following vehicle. For example, issuing alerts, which will be described below, to a following vehicle traveling immediately behind the host vehicle as well as one or more following vehicles traveling behind the first following vehicle can prevent a collision between the following vehicles, or a so-called "pileup".

Figure 5:
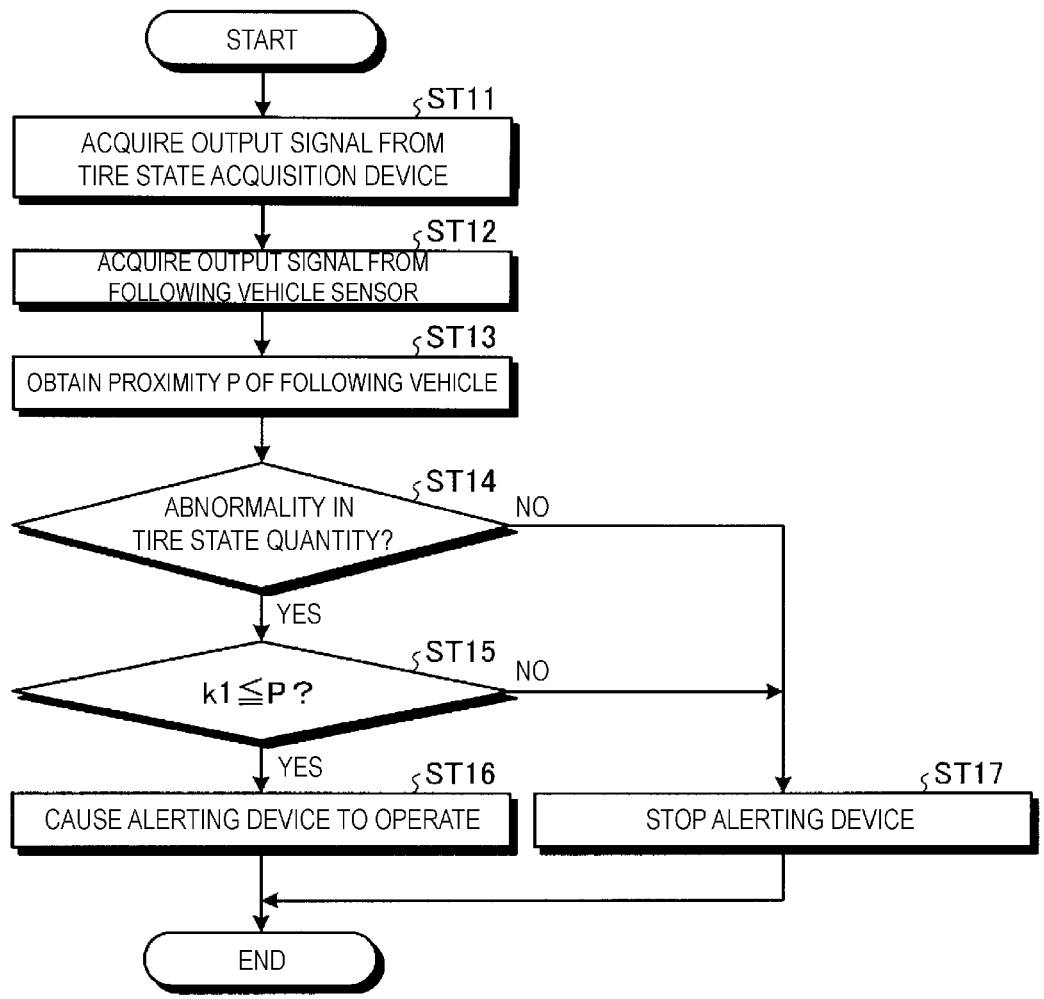
FIG. 5 is a flowchart illustrating operations of the tire state monitoring system illustrated in FIG. 1.

FIGS. 5 and 6 are a flowchart (FIG. 5) and an explanatory diagram (FIG. 6) illustrating operations of the tire state monitoring system illustrated in FIG. 1. Of these diagrams, FIG. 6 illustrates operation conditions of the alerting device 40. Operations of the tire state monitoring system 10 will be described next with reference to the flowchart in FIG. 5.

In step ST11, the monitoring device 30 acquires the output signals from the tire state acquisition devices 20. In other words, as described above, when the host vehicle 100 is traveling, the tire state acquisition devices 20 measure the tire state quantities of the respective tires 110 at a predetermined sampling period, and wirelessly transmit output signals to the monitoring device 30. The monitoring device 30 receives the respective output signals from the tire state acquisition devices 20, and acquires measurement data regarding the tire state quantities of the tires 110. After step ST11, the processing proceeds to step ST12.

In step ST12, the monitoring device 30 acquires the output signal from the following vehicle sensor 310. In other words, while the host vehicle 100 is traveling, the following vehicle sensor 310 measures and outputs the distance or relative velocity with respect to the following vehicle 200 at a predetermined sampling period. The central processing unit 35 of the monitoring device 30 then acquires these output signals. After step ST12, the processing proceeds to step ST13.

In step ST13, the monitoring device 30 obtains the proximity P of the following vehicle 200 to the host vehicle 100. The proximity P is a value corresponding to the distance or relative velocity between the host vehicle 100 and the following vehicle 200. A higher value indicates a shorter distance between the host vehicle 100 and the following vehicle 200 or a faster relative velocity of the following vehicle 200 relative to the host vehicle 100. Specifically, the central processing unit 35 of the monitoring device 30 loads the proximity calculation program 342 from the memory unit 34 and executes the program, and calculates the proximity P of the following vehicle 200 on the basis of the output signal from the following vehicle sensor 310 acquired in step ST12. After step ST13, the processing proceeds to step ST14.

Note that when the following vehicle sensor 310 is a vehicle-to-vehicle distance sensor or a relative velocity sensor, for example, the monitoring device 30 obtains the proximity P of the following vehicle 200 by converting the output signal from such a sensor. Alternatively, when the following vehicle sensor 310 is an image sensor that captures an image of the rearward view of the host vehicle 100, the monitoring device 30 performs image processing on the output signal from the image sensor to extract image information pieces regarding the following vehicle 200, and compares the image information pieces, taken at respective sampling times, on the following vehicle 200 to obtain the proximity P of the following vehicle 200.

In step ST14, the monitoring device 30 determines whether or not an abnormality has arisen in the tire state quantities. Specifically, the central processing unit 35 of the monitoring device 30 loads the abnormality determination program 341 from the memory unit 34 and executes the program, and determines whether or not abnormalities have arisen in the tire state quantities of the tires 110 on the basis of a result of comparing the output signals from the tire state acquisition devices 20 acquired in step ST11 with a predetermined threshold value. This process is the same as in the process of displaying an alert on the in-vehicle display unit 38 described above. When an abnormality has arisen in the tire state quantities, it is assumed that the traveling state of the host vehicle 100 may become unstable, leading to a drop in the travel speed or causing the vehicle to weave, for example. When an affirmative determination is made in step ST14, the processing proceeds to step ST15, whereas when a negative determination is made, the processing proceeds to step ST17.

In step ST15, the monitoring device 30 determines whether or not the proximity P is greater than or equal to a threshold value k1. Specifically, the central processing unit 35 of the monitoring device 30 loads the proximity determination program 343 from the memory unit 34 and executes the program so as to compare the proximity P of the following vehicle 200 obtained in step ST13 with the predetermined threshold value k1 for the above-described comparative determinations. k1 less than or equal to P indicates that the distance between the host vehicle 100 and the following vehicle 200 is small or the following vehicle 200 is approaching the host vehicle 100 at a high velocity, which can be considered that the following vehicle 200 may collide with the host vehicle 100. When an affirmative determination is made in step ST15, the processing proceeds to step ST16, whereas when a negative determination is made, the processing proceeds to step ST17.

In step ST16, the monitoring device 30 causes the alerting device 40 to operate. Specifically, the central processing unit 35 of the alerting device 40 loads the alerting device control program 344 from the memory unit 34 and executes the program so as to control the driving of the alerting device 40 via the alerting device control unit 311. When an abnormality has arisen in the tire state quantities (an affirmative determination in step ST14) and the proximity P of the following vehicle 200 is high (an affirmative determination in step ST15) as illustrated in FIG. 6, the alerting device 40 is driven. Then, the alerting device 40 issues an alert to the following vehicle 200, which catches the attention of the driver of the following vehicle 200 and thus prevents the following vehicle 200 from colliding with the host vehicle 100. After step ST16, the processing terminates and returns to step ST11.

In step ST17, the monitoring device 30 stops the alerting device 40. Specifically, the alerting device control unit 311 of the monitoring device 30 controls the driving of the alerting device 40 to cause the alerting device 40 to stop issuing the alert to the following vehicle 200, which brings the alerting device 40 to an initial state. After step ST17, the processing terminates and returns to step ST11.

Figure 7A:
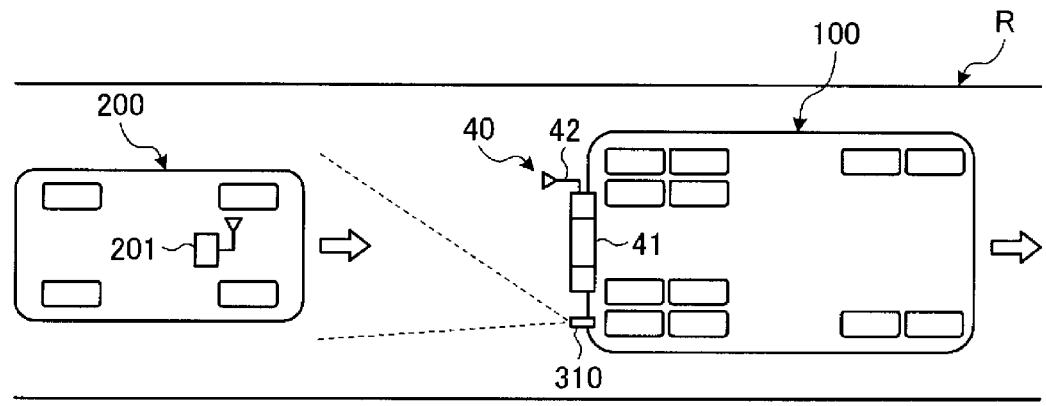
FIGS. 7A and 7B are explanatory diagrams illustrating operations of the tire state monitoring system illustrated in FIG. 1.
Figure 7B:
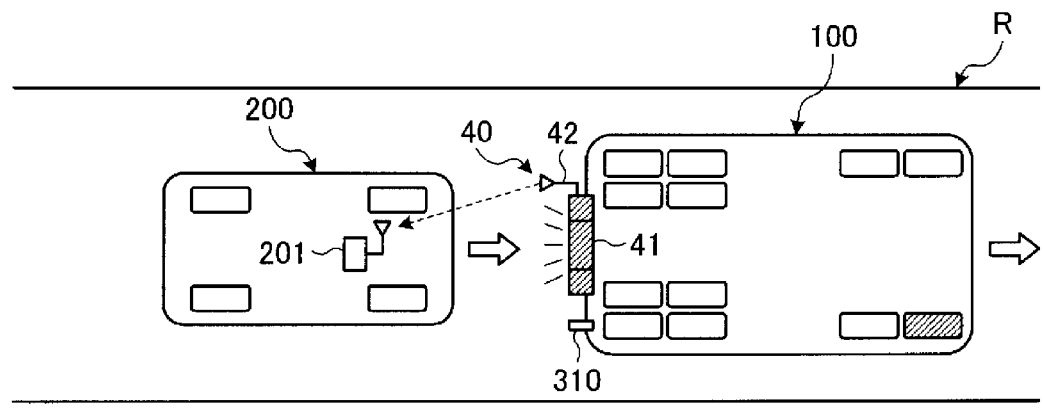

FIGS. 7A and 7B are explanatory diagrams illustrating operations of the tire state monitoring system illustrated in FIG. 1. FIGS. 7A and 7B illustrate specific examples of the operations of the alerting device 40.

As described above, when the host vehicle 100 is traveling, the tire state acquisition devices 20 measure the tire state quantities of the respective tires 110 at a predetermined sampling period, and wirelessly transmit output signals to the monitoring device 30. Additionally, the following vehicle sensor 310 measures and outputs the distance or relative velocity with respect to the following vehicle 200 at a predetermined sampling period. Then, the monitoring device 30 receives the output signals from the tire state acquisition devices 20 and the output signal from the following vehicle sensor 310 (steps ST11 and ST12 in FIG. 5). Additionally, the monitoring device 30 determines the operation conditions of the alerting device 40 (see FIG. 6) on the basis of these output signals (steps ST14 and ST15).

As illustrated in FIG. 7A, when the distance between the host vehicle 100 and the following vehicle 200 is sufficiently large (P<k1: a negative determination in step ST15) or no abnormalities have arisen in the tire state quantities of the tires 110 (a negative determination in step ST14), the following vehicle 200 is unlikely to collide with the host vehicle 100. Accordingly, the alerting device 40 is stopped (step ST17), and no alert is issued from the host vehicle 100 to the following vehicle 200 (see FIG. 6). Specifically, the lamp unit 41 serving as the alerting device 40 is extinguished, and the communicator 42 of the vehicle-to-vehicle communication unit stops transmission of the alert information.

As illustrated in FIG. 7B, when the distance between the host vehicle 100 and the following vehicle 200 is small (k1≤P: an affirmative determination in step ST15) and an abnormality has arisen in the tire state quantity of any of the tires 110 (an affirmative determination in step ST14), the traveling state of the host vehicle 100 may become unstable and the following vehicle 200 may collide with the host vehicle 100. Accordingly, the alerting device 40 is driven (step ST16), and an alert is issued from the host vehicle 100 to the following vehicle 200 (see FIG. 6). Specifically, the lamp unit 41 serving as the alerting device 40 is lighted or the communicator 42 of the vehicle-to-vehicle communication unit transmits the predetermined alert information to the following vehicle 200, and the communicator 201 of the following vehicle 200 receives the alert information from the host vehicle 100, which alerts the driver of the following vehicle 200 to the situation. This catches the attention of the driver of the following vehicle 200, preventing the following vehicle 200 from colliding with the host vehicle 100.

Note that according to the above-described configuration, when at least one of the conditions including: the distance between the host vehicle 100 and the following vehicle 200 is sufficiently large (P<k1: a negative determination in step ST15); and no abnormalities have arisen in the tire state quantities of the tires 110 (a negative determination in step ST14), is met, the alerting device 40 is stopped (step ST17) and the host vehicle 100 is prohibited from issuing an alert to the following vehicle 200, as illustrated in FIG. 6. This configuration suppresses excessive alerts from the host vehicle 100 to the following vehicle 200, and is thus preferable from the standpoint of reducing discomfort and annoyance for the driver of the following vehicle 200.

However, without being limited to such a configuration, when an abnormality has arisen in the tire state quantity of any of the tires 110, the alerting device 40 may be driven such that an alert is issued from the host vehicle 100 to the following vehicle 200 even in the case where the distance between the host vehicle 100 and the following vehicle 200 is sufficiently large (not illustrated). This configuration makes it possible to issue an alert to the following vehicle 200 at an early stage at which a risk of collision with the following vehicle 200 is comparatively low, thus effectively preventing the following vehicle 200 from colliding with the host vehicle 100.

First Modified Example

Figure 8:
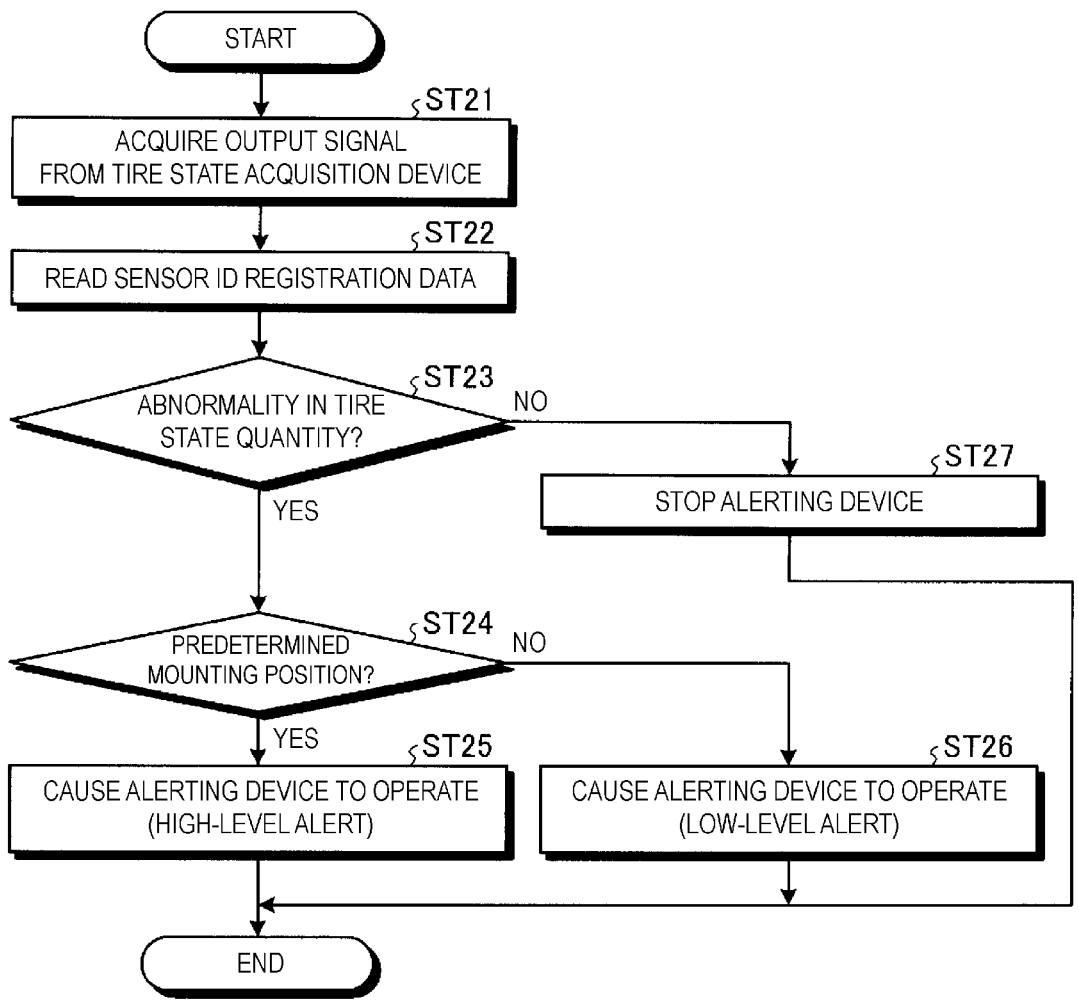
FIG. 8 is a flowchart illustrating operations of a first modified example of the tire state monitoring system illustrated in FIG. 1.
Figure 10A:
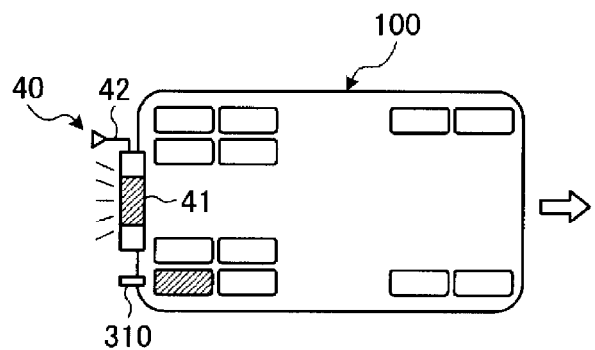
FIGS. 10A and 10B are explanatory diagrams illustrating operations of the first modified example of the tire state monitoring system illustrated in FIG. 1.
Figure 10B:
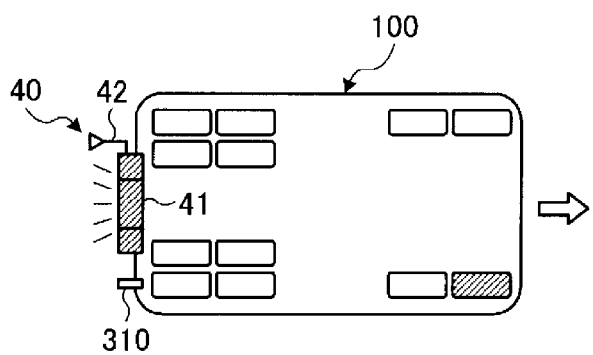

FIGS. 8 to 10B are a flowchart (FIG. 8) and explanatory diagrams (FIGS. 9 to 10B) illustrating operations of a first modified example of the tire state monitoring system illustrated in FIG. 1. Of these diagrams, FIG. 9 illustrates operation conditions of the alerting device 40 indicated in FIG. 8, and FIGS. 10A and 10B illustrate a specific example of operations of the alerting device 40.

According to the configuration described above with reference to FIGS. 5 to 7B, the alerting device 40 operates at only a single alert level, and issues an alert to the following vehicle 200 (see FIG. 6). However, without being limited to such a configuration, the content of the alert issued by the alerting device 40 (a lighting pattern of an alert light or the text content on an alert display, for example) may be changed depending on the mounting position of the tire 110 in which an abnormality in the tire state quantity has arisen. Furthermore, the alert level of the alerting device 40 may be changed in stages. The first modified example, in which the alert level of the alerting device 40 is changed in stages, will be described next with reference to the flowchart in FIG. 8.

In step ST21, the monitoring device 30 acquires the output signals from the tire state acquisition devices 20 (step ST21). This step ST21 is the same as step ST11 in FIG. 5. After step ST21, the processing proceeds to step ST22.

In step ST22, the central processing unit 35 of the monitoring device reads sensor ID registration data 346. After step ST22, the processing proceeds to step ST23.

In step ST23, the monitoring device 30 determines whether or not an abnormality has arisen in the tire state quantities. This step ST23 is the same as step ST14 in FIG. 5. When an affirmative determination is made in step ST23, the processing proceeds to step ST24, whereas when a negative determination is made, the processing proceeds to step ST27.

In step ST24, the monitoring device 30 determines whether or not an abnormality has arisen in the tire state quantity of a tire 110 in a predetermined mounting position. Specifically, on the basis of the tire position identification program 345 loaded from the memory unit 34 and the sensor ID registration data 346, the central processing unit 35 of the monitoring device 30 acquires the mounting position of the tire 110 which has been determined that an abnormality has arisen in the tire state quantity (an affirmative determination in step ST23). The mounting position of the tire 110 can be identified by comparing the sensor ID unique to the tire state acquisition device 20, which is added to the output signal for the tire state quantity, with registration information in the sensor ID registration data 346. Then, the central processing unit 35 executes the tire position identification program 345 to determine whether or not the mounting position of the tire 110 in which an abnormality has arisen matches the predetermined mounting position. Here, the mounting position serving as a determination criterion is set to a steered wheel, as illustrated in FIG. 9. When an affirmative determination is made in step ST24, the processing proceeds to step ST25, whereas when a negative determination is made, the processing proceeds to step ST26.

In steps ST25 and ST26, the monitoring device 30 causes the alerting device 40 to operate. As a result, the alerting device 40 issues an alert to the following vehicle 200 to catch the attention of the driver of the following vehicle 200, preventing the following vehicle 200 from colliding with the host vehicle 100.

At this time, in step ST25, the alerting device 40 carries out an alert operation indicating a high-level alert (an alert at a second alert level), whereas in step ST26, the alerting device 40 carries out an alert operation indicating a low-level alert (an alert at a first alert level). Compared to the low-level alert, the high-level alert is a strong alert that strongly catches the attention of the driver of the following vehicle 200. Accordingly, the alert level is switched in accordance with the mounting position of the tire 110 in which an abnormality has arisen in the tire state quantity. As a result, the alert to the following vehicle 200 is carried out in stages, effectively catching the attention of the driver of the following vehicle 200. After steps ST25 and ST26, the processing terminates and returns to step ST21.

Note that such a stepwise alert is realized by the alerting device 40 having a stage-based alert unit (not illustrated) that issues alerts at a plurality of alert levels. A configuration in which, for example, the alerting device 40 is the lamp unit 41 that issues an alert by carrying out a lighting operation or a flashing operation, and the area, luminance, or the like of the lighting part increases in a plurality of stages or the shape, flashing speed, of the like of the lighting part changes in stages, can be employed as this stage-based alert unit. Alternatively, a configuration in which, for example, the alerting device 40 is a speaker unit that issues an alert by outputting audio and the content of the audio changes in stages, can be employed. Alternatively, a configuration in which, for example, the alerting device 40 is a display unit that issues an alert through an alert display and the content of the display changes in stages, can be employed. Alternatively, a configuration in which the alerting device 40 is the communicator 42 of the vehicle-to-vehicle communication unit that transmits the alert information to the following vehicle 200, and a level of the alert information transmitted to the following vehicle 200 changes in stages, can be employed. Alternatively, a configuration in which, for example, the alerting device 40 is the rear part left and right turn signal lamps that issue an alert through a flashing operation and the speed of the flashing changes in stages, can be employed.

In step ST27, the monitoring device 30 stops the alerting device 40. Specifically, the alerting device control unit 311 of the monitoring device 30 controls the driving of the alerting device 40 to prohibit the alerting device 40 from issuing the alert to the following vehicle 200. After step ST27, the processing terminates and returns to step ST21.

For example, referring to the explanatory diagram in FIG. 9, a high-level alert is issued when the mounting position of the tire 110 in which an abnormality has arisen is a steered wheel (an affirmative determination in step ST24, and step ST25). Conversely, a low-level alert is issued when the mounting position of the tire 110 in which an abnormality has arisen is a wheel aside from the steered wheel (a negative determination in step ST24, and step ST26). When no abnormality has arisen in the tire state quantity of any of the tires 110, the alerting device 40 is stopped and the host vehicle 100 is prohibited from issuing an alert to the following vehicle 200 (a negative determination in step ST23, and step ST27).

A high-level alert is issued when the mounting position of the tire 110 in which an abnormality has arisen is a steered wheel for the following reason. When an abnormality has arisen in the tire 110 on a steered wheel of the host vehicle 100, the steering stability is low and thus the traveling state of the host vehicle 100 may become unstable. Thus, it is preferable to strongly catch the attention of the driver of the following vehicle 200 by issuing a high-level alert to the following vehicle 200.

On the other hand, when an abnormality has arisen in the tire 110 of a wheel aside from a steered wheel, it is possible that the host vehicle 100 continues to travel while maintaining the current traveling state thereof. Thus, it is preferable not to issue excessive alerts to the following vehicle 200 to reduce discomfort and annoyance for the driver of the following vehicle 200.

As a modified example, it is preferable, when the host vehicle 100 is a vehicle having drive wheels and driven wheels, to issue a high-level alert when the mounting position of the tire 110 in which an abnormality has arisen is a drive wheel, for example. When an abnormality has arisen in the tire 110 on a drive wheel of the host vehicle 100, the travel speed may drop suddenly, for example, causing the traveling state of the host vehicle 100 to become unstable. Thus, it is preferable to strongly catch the attention of the driver of the following vehicle 200 by issuing a high-level alert to the following vehicle 200. On the other hand, when an abnormality has arisen in the tire 110 of a driven wheel, it is possible that the host vehicle 100 continues to travel while maintaining the current traveling state thereof. Thus, it is preferable not to issue excessive alerts to the following vehicle 200 to reduce discomfort and annoyance for the driver of the following vehicle 200.

Additionally, it is preferable, when the host vehicle 100 is a vehicle having single wheels and dual wheels (a heavy-duty vehicle, in particular), to issue a high-level alert when the mounting position of the tire 110 in which an abnormality has arisen is a single wheel or the inside wheel of a dual wheel, for example. When an abnormality has arisen in the tire 110 on a single wheel or the inside wheel of a dual wheel of the host vehicle 100, the traveling state of the host vehicle 100 may become unstable due to the effects of the load. Thus, it is preferable to strongly catch the attention of the driver of the following vehicle 200 by issuing a high-level alert to the following vehicle 200. On the other hand, when an abnormality has arisen in the tire 110 of the outside wheel of a dual wheel, it is possible that the host vehicle 100 continues to travel while maintaining the current traveling state thereof. Thus, it is preferable not to issue excessive alerts to the following vehicle 200 to reduce discomfort and annoyance for the driver of the following vehicle 200.

Note that "dual wheel" refers to what is known as a double tire, or a twin wheel and tire arrangement, which is a structure in which a plurality of tires are mounted side by side on each side of a single axle in order to increase the allowable load of the rear axle. Such a configuration increases the allowable load of the vehicle and also increases the accelerating and decelerating forces. The configuration also improves the traveling properties on poor roads, but this increases the burden on the inside tires.

According to the configuration illustrated in FIGS. 10A and 10B, the alerting device 40 is the lamp unit 41, and the area of the lighting part is increased in stages in accordance with the alert level. At a low-level alert (step ST26), the alerting device 40 carries out an alert operation such that only part of the lighting part is lighted or flashed, as illustrated in FIG. 10A. As a result, a preliminary alert is issued to the following vehicle 200 in an initial stage, when the risk of the traveling state of the host vehicle 100 becoming unstable is comparatively low. On the other hand, at a high-level alert, the alerting device 40 carries out an alert operation such that the entire lighting part is lighted or flashed, as illustrated in FIG. 10B. As a result, a stronger alert is issued in a situation in which the risk of the traveling state of the host vehicle 100 becoming unstable is high, effectively catching the attention of the driver of the following vehicle 200.

In the configuration illustrated in FIGS. 8 to 10B, the alerting device 40 operates so as to issue a high-level alert or a low-level alert when an abnormality has arisen in the tire state quantity of any one of the tires 110. However, without being limited to such a configuration, when the host vehicle 100 is, for example, a vehicle having six or more wheels and the traveling state of the host vehicle 100 can be maintained even if abnormalities arise in some of the wheels, it is also possible to issue an alert only to the driver of the host vehicle 100 and not issue an alert to the driver of the following vehicle 200 (that is, prohibit the operation of the alerting device 40). As a result, excessive alerts are not issued to the following vehicle 200, making it possible to reduce discomfort and annoyance for the driver of the following vehicle 200.

Second Modified Example

Figure 11:
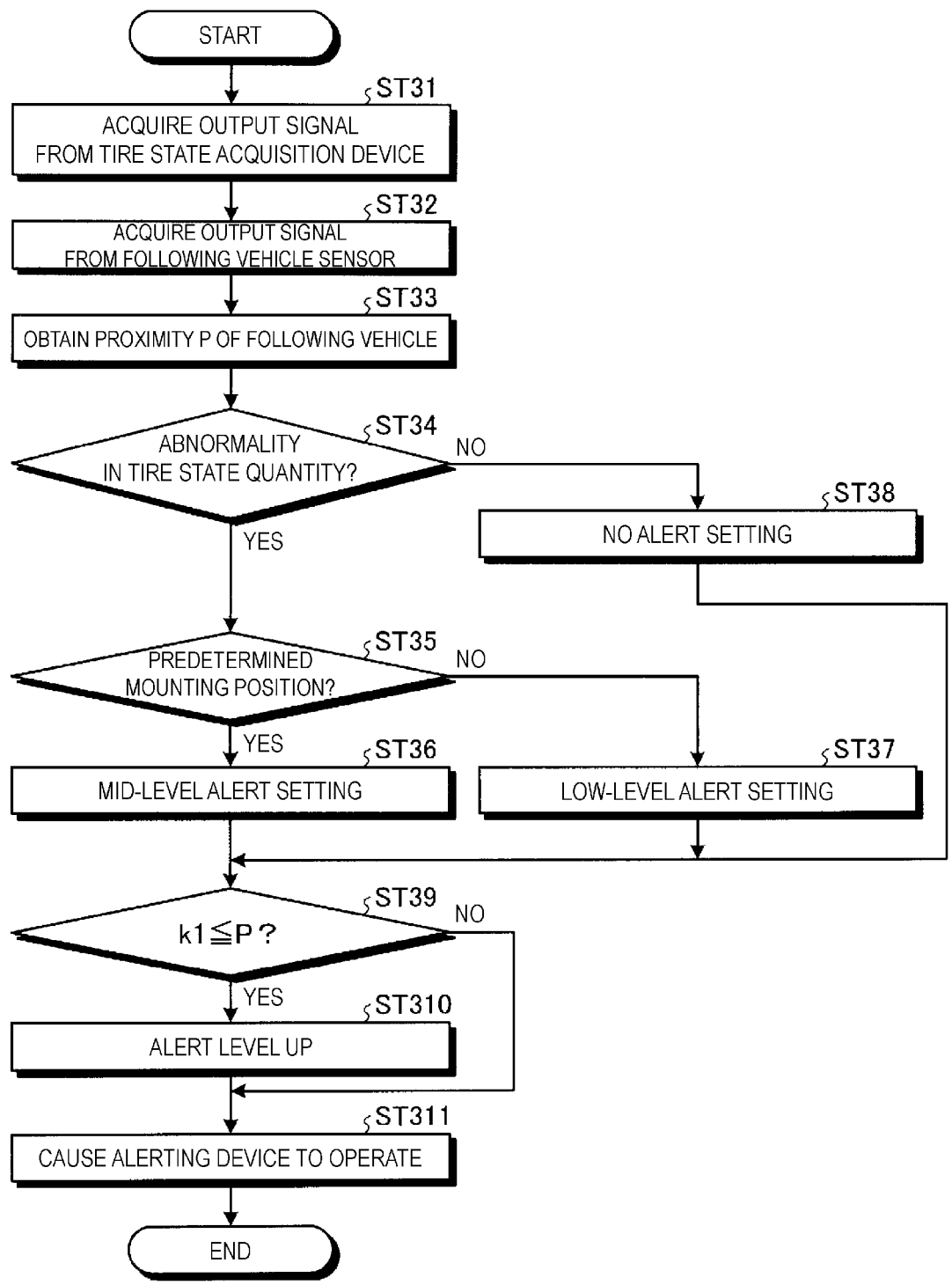
FIG. 11 is a flowchart illustrating operations of a second modified example of the tire state monitoring system illustrated in FIG. 1.

FIGS. 11 to 12B are a flowchart (FIG. 11) and explanatory diagrams (FIGS. 12A and 12B) illustrating operations of a second modified example of the tire state monitoring system illustrated in FIG. 1. Of these diagrams, FIGS. 12A and 12B illustrate operation conditions of the alerting device 40 illustrated in FIG. 11.

In the first modified example illustrated in FIGS. 8 to 10B, the alerting device 40 operates when an abnormality has arisen in the tire state quantity of any one of the tires 110, regardless of the presence/absence of the following vehicle 200. However, without being limited to such a configuration, it is preferable that an alert be issued to the following vehicle 200 when the proximity P of the following vehicle 200 to the host vehicle 100 is high, even in the case where no abnormalities have arisen in the tire state quantities. Furthermore, it is preferable that the alert level of the alerting device 40 be switched in stages on the basis of a relationship between the mounting position of the tire 110 in which an abnormality has arisen and the proximity P of the following vehicle 200. This second modified example will be described next with reference to the flowchart in FIG. 11.

In steps ST31 and ST32, the monitoring device 30 acquires the output signals from the tire state acquisition devices 20 (step ST31), and acquires the output signal from the following vehicle sensor 310 (step ST32). These steps ST31 and ST32 are the same as steps ST21 and ST22 in FIG. 8. The processing proceeds to step ST33 after the steps ST31 and ST32.

In step ST33, the monitoring device 30 obtains the proximity P of the following vehicle 200 to the host vehicle 100. This step ST33 is the same as step ST13 in FIG. 5. After step ST33, the processing proceeds to step ST34.

In step ST34, the monitoring device 30 determines whether or not an abnormality has arisen in the tire state quantities. This step ST34 is the same as step ST23 in FIG. 8. When an affirmative determination is made in step ST34, the processing proceeds to step ST35, whereas when a negative determination is made, the processing proceeds to step ST38.

In step ST35, the monitoring device 30 determines whether or not an abnormality has arisen in the tire state quantity of a tire 110 in a predetermined mounting position. This step ST35 is the same as step ST24 in FIG. 8. When an affirmative determination is made in step ST35, the processing proceeds to step ST36, whereas when a negative determination is made, the processing proceeds to step ST37.

In steps ST36 to ST38, the monitoring device 30 selects an operation setting of the alerting device 40. Here, the operations of the alerting device 40 are classified into four stages, namely (a) a no alert setting, (b) a low-level alert setting, (c) a mid-level alert setting, and (d) a high-level alert setting. The (a) no alert setting is a setting in which the alerting device 40 is stopped and prohibited from issuing an alert to the following vehicle 200. The (b) low-level alert setting is a setting in which the alerting device 40 issues a minor alert. Compared to the low-level alert, the (c) mid-level alert setting is to issue a strong alert that strongly catches the attention of the driver of the following vehicle 200. Likewise, compared to the mid-level alert, the (d) high-level alert setting is to issue a strong alert that strongly catches the attention of the driver of the following vehicle 200. In step ST36, the (c) mid-level alert setting is selected. In step ST37, the (b) low-level alert setting is selected. In step ST38, the (a) no alert setting is selected. The processing proceeds to step ST39 after the steps ST36 to ST38.

In step ST39, the monitoring device 30 determines whether or not the proximity P is greater than or equal to a threshold value k1. This step ST39 is the same as step ST15 in FIG. 5. When an affirmative determination is made in step ST39, the processing proceeds to step ST310, whereas when a negative determination is made, the processing proceeds to step ST311.

In step ST310, the monitoring device 30 increases the operation setting of the alerting device 40 by one stage. In other words, the operation setting of the alerting device 40 selected in steps ST36 to ST38 is changed: to the low-level alert setting when the operation setting is the no alert setting (1); to the mid-level alert setting when the operation setting is the low-level alert setting (2); and to the high-level alert setting when the operation setting is the mid-level alert setting (3). After step ST310, the processing proceeds to step ST311.

In step ST311, the monitoring device 30 causes the alerting device 40 to operate. As a result, the alerting device 40 issues an alert to the following vehicle 200 to catch the attention of the driver of the following vehicle 200, preventing the following vehicle 200 from colliding with the host vehicle 100.

Additionally, the monitoring device 30 causes the alerting device 40 to operate in accordance with the alert setting set in steps ST36 to ST38 and ST310. Accordingly, the alert level of the alerting device 40 is switched in stages on the basis of a relationship between the mounting position of the tire 110 in which an abnormality has arisen and the proximity P of the following vehicle 200. As a result, the alert to the following vehicle 200 is switched as appropriate according to the circumstances.

For example, referring to the explanatory diagram illustrated in FIGS. 12A and 12B, the operation setting of the alerting device 40 is selected in accordance with a result of determining whether or not the mounting position of the tire 110 in which an abnormality in the tire state quantity has arisen is a steered wheel (step ST35 in FIG. 11) and whether or not the proximity P of the following vehicle 200 to the host vehicle 100 is high (step ST39). Additionally, when an abnormality has arisen in the tire state quantity of any of the tires 110, the alerting device 40 operates to issue an alert regardless of the mounting position of the tire 110 and the proximity P of the following vehicle 200 (FIGS. 12A and 12B). When no abnormality has arisen in the tire state of any of the tires 110, the alerting device 40 is prohibited from issuing an alert (FIG. 12A: a negative determination in step ST34, and step ST38). Additionally, an alert is issued to the following vehicle 200 when the proximity P of the following vehicle 200 to the host vehicle 100 is high, even in the case where no abnormalities have arisen in the tire state quantities (FIG. 12B: a negative determination in step ST34, step ST38, and an affirmative determination in step ST39).

Third Modified Example

Figure 13:
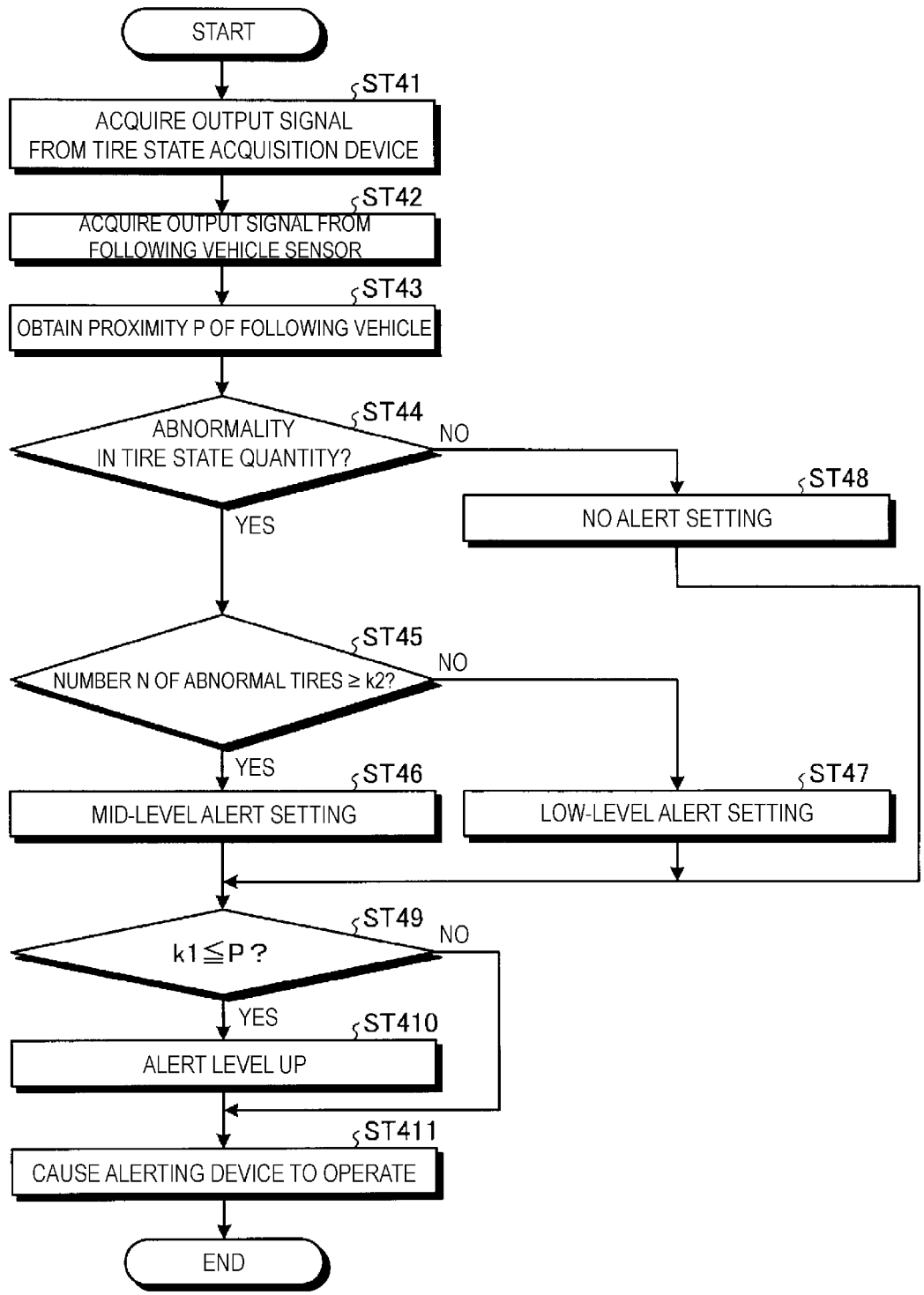
FIG. 13 is a flowchart illustrating operations of a third modified example of the tire state monitoring system illustrated in FIG. 1.

FIGS. 13 to 14B are a flowchart (FIG. 13) and explanatory diagrams (FIGS. 14A and 14B) illustrating operations of a third modified example of the tire state monitoring system illustrated in FIG. 1. Of these drawings, FIGS. 14A and 14B illustrate operation conditions of the alerting device 40 illustrated in FIG. 13.

In the first modified example illustrated in FIGS. 8 to 10B and the second modified example illustrated in FIGS. 11 to 12B, the alert level of the alerting device 40 is switched in stages on the basis of the mounting position of the tire 110 in which an abnormality has arisen. However, without being limited to such a configuration, the alert level of the alerting device 40 may be changed in stages depending on the number of tires 110 in which an abnormality has arisen. This third modified example will be described next with reference to the flowchart in FIG. 13.

In steps ST41 to ST43, the monitoring device 30 acquires the output signals from the tire state acquisition devices 20 (step ST41), acquires the output signal from the following vehicle sensor 310 (step ST42), and obtains the proximity P of the following vehicle 200 to the host vehicle 100 (step ST43). These steps ST31 to ST33 are the same as steps ST31 to ST33 in FIG. 11. After steps ST41 to ST43, the processing proceeds to step ST44.

In step ST44, the monitoring device 30 determines whether or not an abnormality has arisen in the tire state quantities. This step ST44 is the same as step ST34 in FIG. 11. When an affirmative determination is made in step ST44, the processing proceeds to step ST45, whereas when a negative determination is made, the processing proceeds to step ST48.

In step ST45, the monitoring device 30 determines whether or not the number N of the tires 110 in which an abnormality has arisen in the tire state quantities is greater than or equal to a threshold value k2. The greater the number N of the tires 110 in which abnormalities have arisen, the more unstable the traveling state of the host vehicle 100 becomes. When an affirmative determination is made in step ST45, the processing proceeds to step ST46, whereas when a negative determination is made, the processing proceeds to step ST47.

In steps ST46 to ST48, the monitoring device 30 selects an operation setting of the alerting device 40. Here, the operations of the alerting device 40 are classified into four stages, namely (a) a no alert setting, (b) a low-level alert setting, (c) a mid-level alert setting, and (d) a high-level alert setting. These steps ST46 to ST48 are the same as steps ST36 to ST38 in FIG. 11. After steps ST46 to ST48, the processing proceeds to step ST49.

In step ST49, the monitoring device 30 determines whether or not the proximity P is greater than or equal to the threshold value k1. This step ST49 is the same as step ST39 in FIG. 11. When an affirmative determination is made in step ST49, the processing proceeds to step ST410, whereas when a negative determination is made, the processing proceeds to step ST411.

In step ST410, the monitoring device 30 increases the operation setting of the alerting device 40 by one stage. This step ST410 is the same as step ST310 in FIG. 11. After step ST410, the processing proceeds to step ST411.

In step ST411, the monitoring device 30 causes the alerting device 40 to operate. As a result, the alerting device 40 issues an alert to the following vehicle 200 to catch the attention of the driver of the following vehicle 200, preventing the following vehicle 200 from colliding with the host vehicle 100.

Additionally, the monitoring device 30 causes the alerting device 40 to operate in accordance with the alert setting set in steps ST46 to ST48 and ST410. Accordingly, the alert level of the alerting device 40 is switched in stages on the basis of a relationship between the number N of the tires 110 in which abnormalities have arisen and the proximity P of the following vehicle 200. As a result, the alert to the following vehicle 200 is switched as appropriate according to the circumstances.

For example, referring to the explanatory diagram illustrated in FIGS. 14A and 14B, the operation setting of the alerting device 40 is selected in accordance with a result of determining whether or not the number N of the tires 110 in which abnormalities in the tire state quantities have arisen is multiple (k2≤N) (step ST45 in FIG. 13) and whether or not the proximity P of the following vehicle 200 to the host vehicle 100 is high (step ST49). Additionally, when an abnormality has arisen in the tire state quantity of any of the tires 110 (1≤N), the alerting device 40 operates to issue an alert regardless of the proximity P of the following vehicle 200 (FIGS. 14A and 14B). When no abnormality has arisen in the tire state of any of the tires 110 (N=0), the alerting device 40 is prohibited from issuing an alert (FIG. 14A: a negative determination in step ST44, and step ST48). Additionally, an alert is issued to the following vehicle 200 when the proximity P of the following vehicle 200 to the host vehicle 100 is high, even in the case where no abnormalities have arisen in the tire state quantities (FIG. 14B: a negative determination in step ST44, step ST48, and an affirmative determination in step ST49).

Effects

As described above, this tire state monitoring system 10 includes: the plurality of tire state acquisition devices 20 installed on a plurality of tires 110 in the host vehicle 100, the tire state acquisition devices 20 obtaining tire state quantities; the monitoring device 30 that receives each output signal from the plurality of tire state acquisition devices 20 and performs predetermined processing; and the alerting device 40 that issues an alert to the following vehicle 200 (see FIG. 1). In addition, the monitoring device 30 puts the alerting device 40 into operation when a predetermined abnormality has arisen in the tire state quantities (see FIG. 5).

According to this configuration, the monitoring device 30 causes the alerting device 40 to issue an alert to the following vehicle 200 when an abnormality has arisen in the tire state quantities (see FIG. 5). This configuration provides an advantage in that in a situation where the traveling state of the host vehicle 100 may become unstable, an alert is issued as appropriate to the following vehicle 200 so as to prevent the following vehicle 200 from colliding with the host vehicle 100.

Additionally, according to this tire state monitoring system 10, the monitoring device 30 changes the content of the alert of the alerting device 40 depending on the mounting position of the tire 110 in which an abnormality has arisen (see FIG. 8). According to this configuration, the content of the alert issued from the host vehicle 100 to the following vehicle 200 changes depending on the mounting position of the tire 110 in which an abnormality has arisen. This configuration provides an advantage in that the alert to the following vehicle 200 can be issued appropriately.

Additionally, according to this tire state monitoring system 10, the monitoring device 30 causes the alerting device 40 to operate at the first alert level when an abnormality has arisen in the tire state quantity of a tire 110 mounted on a wheel aside from a steered wheel of the host vehicle 100, and causes the alerting device 40 to operate at the second alert level higher alert than the first alert level when an abnormality has arisen in the tire state quantity of a tire 110 mounted on a steered wheel of the host vehicle 100 (see FIG. 8). According to this configuration, an alert can be issued to the following vehicle 200 at a higher alert level when an abnormality has arisen in a tire 110 on a steered wheel than when an abnormality has arisen in a tire 110 on another wheel. This configuration provides an advantage in that the alert to the following vehicle 200 can be issued appropriately.

Additionally, according to this tire state monitoring system 10, the monitoring device 30 causes the alerting device 40 to operate at the first alert level when an abnormality has arisen in the tire state quantity of a tire 110 mounted on a driven wheel of the host vehicle 100, and causes the alerting device 40 to operate at the second alert level higher than the first alert level when an abnormality has arisen in the tire state quantity of a tire 110 mounted on a drive wheel of the host vehicle 100 (see FIG. 8). According to this configuration, an alert can be issued to the following vehicle 200 at a higher alert level when an abnormality has arisen in a tire 110 on a drive wheel than when an abnormality has arisen in a tire 110 on a driven wheel. This configuration provides an advantage in that the alert to the following vehicle 200 can be issued appropriately.

Additionally, according to this tire state monitoring system 10, the monitoring device 30 causes the alerting device 40 to operate at the first alert level when an abnormality has arisen in the tire state quantity of a tire 110 mounted on one wheel of a dual wheel of the host vehicle 100, and causes the alerting device 40 to operate at the second alert level higher than the first alert level when an abnormality has arisen in the tire state quantity of a tire mounted on a single wheel of the host vehicle 100 (see FIG. 8). According to this configuration, an alert can be issued to the following vehicle 200 at a higher alert level when an abnormality has arisen in a tire 110 on a single wheel than when an abnormality has arisen in a tire 110 on a dual wheel. This configuration provides an advantage in that the alert to the following vehicle 200 can be issued appropriately.

Additionally, according to this tire state monitoring system 10, the monitoring device 30 causes the alerting device 40 to operate at the first alert level when an abnormality has arisen in the tire state quantity of a tire 110 mounted on an outside wheel of a dual wheel of the host vehicle 100, and causes the alerting device 40 to operate at the second alert level higher than the first alert level when an abnormality has arisen in the tire state quantity of a tire mounted on an inside wheel of a dual wheel of the host vehicle 100 (see FIG. 8). According to this configuration, an alert can be issued to the following vehicle 200 at a higher alert level when an abnormality has arisen in a tire 110 on an inside wheel of a dual wheel than when an abnormality has arisen in a tire 110 on an outside wheel of a dual wheel. This configuration provides an advantage in that the alert to the following vehicle 200 can be issued appropriately.

Additionally, according to this tire state monitoring system 10, the monitoring device 30 changes the content of the alert of the alerting device 40 depending on the number N of the tires 110 in which abnormalities have arisen (see FIG. 13). According to this configuration, the content of the alert issued from the host vehicle 100 to the following vehicle 200 changes depending on the number N of the tires 110 in which abnormalities have arisen. This configuration provides an advantage in that the alert to the following vehicle 200 can be issued appropriately.

Additionally, according to this tire state monitoring system 10, the monitoring device 30 causes the alerting device 40 to operate at the first alert level when an abnormality has arisen in the tire state quantity of one of the tires 110, and causes the alerting device 40 to operate at the second alert level higher than the first alert level when abnormalities have arisen in the tire state quantities of a plurality of the tires 110 (see FIG. 13). According to this configuration, the level of the alert issued from the host vehicle 100 to the following vehicle 200 changes in stages depending on the number N of the tires 110 in which abnormalities have arisen. This configuration provides an advantage in that the alert to the following vehicle 200 can be issued appropriately.

Additionally, this tire state monitoring system 10 includes the following vehicle sensor 310 that acquires information needed to obtain the proximity P of the following vehicle 200 to the host vehicle 100 (see FIGS. 1 and 3). Additionally, when the proximity P of the following vehicle 200 is greater than or equal to a predetermined threshold value, the monitoring device 30 causes the alerting device 40 to operate at an alert level higher than an alert level used when the proximity P of the following vehicle 200 is less than the threshold value (see FIGS. 11 and 13). According to this configuration, the level of the alert issued from the host vehicle 100 to the following vehicle 200 changes in stages depending on the proximity P of the following vehicle 200 to the host vehicle 100. This configuration provides an advantage in that the alert to the following vehicle 200 can be issued appropriately.

Additionally, according to this tire state monitoring system 10, the monitoring device 30 prohibits the alerting device 40 from issuing an alert when no abnormalities have arisen in the tire state quantities. This configuration suppresses excessive alerts from the host vehicle 100 to the following vehicle 200, and thus has an advantage of reducing discomfort and annoyance for the driver of the following vehicle 200.

The invention claimed is:

1. A tire state monitoring system mounted in a vehicle having six or more wheels, comprising:
   a following vehicle sensor configured to acquire information needed to obtain a proximity of a following vehicle to a host vehicle,
   a plurality of tire state acquisition devices installed on six or more tires of the host vehicle, each of the tire state acquisition devices being configured to acquire a tire state quantity;
   a monitoring device configured to receive an output signal from the following vehicle sensor and each of the plurality of tire state acquisition devices and perform predetermined processing; and
   an alerting device configured to issue alerts at a plurality of alert levels to the following vehicle, wherein
   the monitoring device is configured to:
      prohibit the alerting device from issuing the alerts when the proximity of the following vehicle is less than a predetermined threshold value and no abnormality has arisen in the tire state quantity of any the tires of the host vehicle,
      cause the alerting device to operate at a first alert level when the proximity of the following vehicle is less than the threshold value and the abnormality has arisen in the tire state quantity of a tire mounted on a wheel other than a steered wheel of the host vehicle,
      cause the alerting device to operate at a second alert level when the proximity of the following vehicle is less than the threshold value and the abnormality has arisen in the tire state quantity of a tire mounted on the steered wheel of the host vehicle,
      cause the alerting device to operate at the first alert level when the proximity of the following vehicle is greater than or equal to the threshold value and no abnormality has arisen in the tire state quantity of any the tires of the host vehicle,
      cause the alerting device to operate at the second alert level when the proximity of the following vehicle is greater than or equal to the threshold value and the abnormality has arisen in the tire state quantity of the tire mounted on the wheel other than the steered wheel of the host vehicle, and
      cause the alerting device to operate at a third alert level when the proximity of the following vehicle is greater than or equal to the threshold value and the abnormality has arisen in the tire state quantity of the tire mounted on the steered wheel of the host vehicle.

* * * * *